(12) United States Patent
Liu et al.

(10) Patent No.: US 11,054,794 B2
(45) Date of Patent: Jul. 6, 2021

(54) INFORMATION TRANSMITTING METHOD, CLOUD SERVICE PLATFORM AND A SMART SYSTEM FOR ANALYZING USER DATA OR SMART HOME APPLIANCE DATA

(71) Applicant: SICHUAN CHANGHONG ELECTRIC CO., LTD., Sichuan (CN)

(72) Inventors: Dong Liu, Sichuan (CN); Xiaodong Li, Sichuan (CN); Xiangjun Gao, Sichuan (CN)

(73) Assignee: SICHUAN CHANGHONG ELECTRIC CO., LTD., Sichuan (CN)

( * ) Notice: Subject to any disclaimer, the term of this patent is extended or adjusted under 35 U.S.C. 154(b) by 139 days.

(21) Appl. No.: 15/577,244

(22) PCT Filed: May 26, 2016

(86) PCT No.: PCT/CN2016/083502
§ 371 (c)(1),
(2) Date: Nov. 27, 2017

(87) PCT Pub. No.: WO2016/192579
PCT Pub. Date: Dec. 8, 2016

(65) Prior Publication Data
US 2018/0164758 A1 Jun. 14, 2018

(30) Foreign Application Priority Data
May 29, 2015 (CN) .......... 201510290320.X

(51) Int. Cl.
*G05B 15/02* (2006.01)
*H04L 29/08* (2006.01)
*H04L 12/28* (2006.01)

(52) U.S. Cl.
CPC .......... *G05B 15/02* (2013.01); *H04L 12/2816* (2013.01); *H04L 12/2823* (2013.01);
(Continued)

(58) Field of Classification Search
None
See application file for complete search history.

(56) References Cited

U.S. PATENT DOCUMENTS 7,526,539 B1 * 4/2009 Hsu ............... H04L 12/2818
709/203
10,003,620 B2 * 6/2018 Deshpande ........... H04L 67/22
(Continued)

FOREIGN PATENT DOCUMENTS

CN 200510028426 A * 2/2007 ........... G06F 9/445
CN 200610007716 A * 7/2008 ........... H04L 12/24
(Continued)

OTHER PUBLICATIONS

Carrillo, E., Benitez, V., Mendoza, C., Pacheco, C., "IoT Framework for Smart Buildings with Cloud Computing", 2015, IEEE. (Year: 2015).*

(Continued)

*Primary Examiner* — Mohammad Ali
*Assistant Examiner* — Kelvin Booker
(74) *Attorney, Agent, or Firm* — Renner, Otto, Boisselle & Sklar, LLP

(57) ABSTRACT

The present disclosure discloses an information processing method, a cloud service platform and an information processing system. The method includes: receiving, by a cloud service platform, appliance operating data and user data transmitted by a smart home appliance control device; analyzing the appliance operating data and the user data to generate an analysis result; judging whether the analysis result satisfies a preset condition; and transmitting the analysis result to user equipment of the user when the analysis result satisfies the preset condition, so that the user can
(Continued)

manage the at least two smart home appliances according to the analysis result received and output by the user equipment.

6 Claims, 3 Drawing Sheets

(52) U.S. Cl.
CPC ............ *H04L 29/08* (2013.01); *H04L 67/125* (2013.01); *G05B 2219/25168* (2013.01); *G05B 2219/2642* (2013.01); *H04L 67/10* (2013.01)

(56) References Cited

U.S. PATENT DOCUMENTS

| | | | | |
|---|---|---|---|---|
| 2006/0178918 A1* | 8/2006 | Mikurak | .......... | G06Q 10/06375 705/7.25 |
| 2008/0215796 A1* | 9/2008 | Lam | .......... | G06F 9/44505 711/100 |
| 2009/0144718 A1* | 6/2009 | Boggs | .......... | G06F 8/65 717/170 |
| 2009/0249283 A1* | 10/2009 | Bourdon | .......... | G06F 8/61 717/104 |
| 2010/0191487 A1* | 7/2010 | Rada | .......... | G01D 4/004 702/60 |
| 2010/0217837 A1* | 8/2010 | Ansari | .......... | G06F 16/68 709/218 |
| 2011/0010720 A1* | 1/2011 | Smith | .......... | G06F 11/3688 718/102 |
| 2011/0063093 A1* | 3/2011 | Fung | .......... | G06Q 10/0875 340/10.52 |
| 2011/0183733 A1* | 7/2011 | Yoshida | .......... | H04L 63/0823 463/1 |
| 2011/0184575 A1* | 7/2011 | Kawamoto | .......... | G06T 1/0028 700/292 |
| 2011/0184585 A1* | 7/2011 | Matsuda | .......... | H04L 63/12 700/297 |
| 2011/0184586 A1* | 7/2011 | Asano | .......... | G05B 15/02 700/297 |
| 2011/0185196 A1* | 7/2011 | Asano | .......... | B60L 53/51 713/300 |
| 2011/0251807 A1* | 10/2011 | Rada | .......... | G01D 4/00 702/61 |
| 2012/0173857 A1* | 7/2012 | Kobraei | .......... | G06F 8/654 713/2 |
| 2012/0197455 A1* | 8/2012 | Lee | .......... | H02J 3/008 700/296 |
| 2012/0310800 A1* | 12/2012 | Xia | .......... | G06Q 30/04 705/34 |
| 2013/0268806 A1* | 10/2013 | Park | .......... | H04M 1/24 714/15 |
| 2013/0307702 A1* | 11/2013 | Pal | .......... | A47L 15/0047 340/870.02 |
| 2014/0067131 A1* | 3/2014 | Park | .......... | A47L 15/4293 700/275 |
| 2014/0098247 A1* | 4/2014 | Rao | .......... | H04W 4/20 348/207.1 |
| 2014/0118120 A1* | 5/2014 | Chen | .......... | G08C 17/02 340/12.5 |
| 2014/0121786 A1* | 5/2014 | Chen | .......... | G05B 15/02 700/19 |
| 2014/0129006 A1* | 5/2014 | Chen | .......... | G05B 15/02 700/90 |
| 2014/0156081 A1* | 6/2014 | Ha | .......... | D06F 33/02 700/275 |
| 2014/0156082 A1* | 6/2014 | Ha | .......... | D06F 33/02 700/275 |
| 2014/0197934 A1* | 7/2014 | Ha | .......... | H04L 12/12 340/12.5 |
| 2014/0207707 A1* | 7/2014 | Na | .......... | H04L 12/2818 705/412 |
| 2014/0257532 A1* | 9/2014 | Kim | .......... | G05B 15/02 700/90 |
| 2014/0304398 A1* | 10/2014 | Carlen | .......... | G06F 9/54 709/224 |
| 2015/0004967 A1* | 1/2015 | Jiang | .......... | H04M 15/8033 455/433 |
| 2015/0109112 A1 | 4/2015 | Fadell et al. | | |
| 2015/0180993 A1* | 6/2015 | Yamada | .......... | G06F 16/951 709/223 |
| 2015/0293511 A1* | 10/2015 | Laufer | .......... | G08B 7/06 700/275 |
| 2016/0021595 A1* | 1/2016 | Czaja | .......... | H04W 36/32 455/440 |
| 2016/0070718 A1* | 3/2016 | Lee | .......... | H04L 12/2803 707/610 |
| 2016/0081127 A1* | 3/2016 | Lee | .......... | H04L 12/2809 709/228 |
| 2016/0087834 A1* | 3/2016 | Zhao | .......... | H04L 12/2807 709/220 |
| 2016/0098923 A1* | 4/2016 | Patkar | .......... | G08C 23/04 398/106 |
| 2016/0163186 A1* | 6/2016 | Davidson | .......... | G06Q 50/16 340/506 |
| 2016/0174268 A1* | 6/2016 | Hu | .......... | H04L 12/2803 709/227 |
| 2016/0189535 A1* | 6/2016 | Huang | .......... | G05B 15/02 340/12.5 |
| 2016/0195861 A1* | 7/2016 | Chen | .......... | H04L 12/2816 700/275 |
| 2016/0232116 A1* | 8/2016 | Bone | .......... | H04W 12/37 |
| 2016/0349779 A1* | 12/2016 | Fan | .......... | G05F 1/66 |
| 2016/0359872 A1* | 12/2016 | Yadav | .......... | H04L 63/1425 |
| 2017/0032374 A1* | 2/2017 | Doddamani | .......... | G06Q 20/4016 |
| 2017/0344703 A1* | 11/2017 | Ansari | .......... | H04M 15/73 |
| 2018/0316518 A1* | 11/2018 | Farrahi Moghaddam | .......... | H04L 47/70 |

FOREIGN PATENT DOCUMENTS

| | | | | |
|---|---|---|---|---|
| CN | 102820988 A | 12/2012 | | |
| CN | 102981491 A | 3/2013 | | |
| CN | 102984037 A | 3/2013 | | |
| CN | 103019162 A | 4/2013 | | |
| CN | 103389719 A | 11/2013 | | |
| CN | 103607446 A | 2/2014 | | |
| CN | 103973748 A | 8/2014 | | |
| CN | 104331041 A | 2/2015 | | |
| CN | 104394045 A | 3/2015 | | |
| CN | 104657137 A * | 5/2015 | ............ | G06F 9/44 |
| CN | 201310738785 A * | 7/2015 | ............ | G06F 9/445 |
| CN | 105045114 A | 11/2015 | | |
| CN | 204990281 U * | 1/2016 | ............ | G06F 11/36 |
| EP | 2107458 A1 * | 10/2009 | ............ | G06F 9/445 |
| EP | 2 933 696 A1 | 10/2015 | | |
| JP | 2004341880 A * | 12/2004 | ............ | G06F 9/445 |

OTHER PUBLICATIONS

Cui, Y., Kim, M., Gu, Y., Jung,J.-J., 2 and Lee, H., "Home Appliance Management System for Monitoring Digitized Devices Using Cloud Computing Technology in Ubiquitous Sensor Network Environment", Aug. 2013, Hindawi Publish Corp Intl Journal of Distributed Sensor Networks vol. 2014, Article ID 174097. (Year: 2013).*

Dey,S., Roy,A., Das,S., "Home Automation Using Internet of Thing", 2016 IEEE. (Year: 2016).*

Boyun Eom, Choonhwa Lee, Changwoo Yoon, Hyunwoo Lee, and Won Ryu, "A Platform as a Service for Smart Home", International Journal of Future Computer and Communication, vol. 2, No. 3, Jun. 2013. (Year: 2013).*

Basil Hamed, "Design & Implementation of Smart House Control Using LabVIEW", International Journal of Soft Computing and Engineering (IJSCE) ISSN: 2231-2307, vol. 1, Issue-6, Jan. 2012. (Year: 2012).*

P.Kabilan, H.Nafil Askar, P.Naresh Anand, S.Manimaran, G.Venkatesh, "Facebook Based Home Appliances Security Control and Monitor-

(56) References Cited

OTHER PUBLICATIONS ing Using Microcontroller", Asia Pacific Journal of Research vol. I. Issue XXV, Mar. 2015 ISSN: 2320-5504, E-ISSN-2347-4793. (Year: 2015).*

Kodali,R.K, Jain,V., Bose, S. and Boppana, L., "IoT Based Smart Security and Home Automation System", International Conference on Computing, Communication and Automation (ICCCA2016). (Year: 2016).*

Piyare, R. and Lee, S.R., "Smart Home-Control and Monitoring System Using Smart Phone", ICCA 2013, ASTL vol. 24, pp. 83-86, 2013. (Year: 2013).*

J.Rajalekshmi, SivaSankari.G.G, "IoT Framework for Smart Home Using Cloud Computing via Open Source Mobile Platform", International Journal of Computer Engineering and Applications, ICCSTAR-2016, Special Issue, May 2016. (Year: 2016).*

Singh,S., Saha.D., Khaware.P., Das,S., Raj,D., Das, S., Nandi, C.S., "Home Automation and Internet of Things", International Advanced Research Journal in Science, Engineering and Technology vol. 3, Issue 6, Jun. 2016. (Year: 2016).*

Yang,Y., Wei,Z., Jia,D., Cong,Y., and Shan, R., "A Cloud Architecture Based on Smart Home", 2010 Second International Workshop on Education Technology and Computer Science. (Year: 2010).*

Soliman, M.; Abiodun, T.; Hamouda, T.; Zhou, J.; and Lung, C.-H., "Smart Home: Integrating Internet of Things with Web Services and Cloud Computing", 2013 IEEE International Conference on Cloud Computing Technology and Science. (Year: 2013).*

Cui, Y.; Kim, M.; Kum, S.W.; Jung, J.-J.; Lim, T.-B.; Lee, H.; and Choi, O., "Home Appliance Control and Monitoring System Model Based on Cloud Computing Technology", 2014, Mobile, Ubiquitous, and Intelligent Computing, Lecture Notes in Electrical Engineering 274. (Year: 2014).*

Cui, Y.; Kim, M.; Gu, Y.; Jung, J.-J.; and Lee, H., "Home Appliance Management System for Monitoring Digitized Devices Using Cloud Computing Technology in Ubiquitous Sensor Network Environment", Hindawi Publishing Corporation International Journal of Distributed Sensor Networks, vol. 2014. (Year: 2014).*

International Search Report for corresponding International Application No. PCT/CN2016/083502 dated Sep. 1, 2016.

* cited by examiner

INFORMATION TRANSMITTING METHOD, CLOUD SERVICE PLATFORM AND A SMART SYSTEM FOR ANALYZING USER DATA OR SMART HOME APPLIANCE DATA

This application is a US National Stage of International Application No. PCT/CN2016/083502, filed on May 26, 2016, designating the United States and claiming priority to Chinese Patent Application No. 2015/10290320.X, filed with the Chinese Patent Office on May 29, 2015 and entitled "An information processing method, a cloud service platform, and an information processing system", the content of which is hereby incorporated by reference in its entirety.

FIELD

The present disclosure relates to the field of electronics, particularly to an information processing method, a cloud service platform and an information processing system.

BACKGROUND

With the development of electronic technologies, more and more people start to use smart home appliances such as a smart TV, a smart refrigerator, a smart air conditioner, a smart range hood and a smart range. Usually a house is configured with several smart home appliances, and a user has to manage each smart home appliance separately according to corresponding manuals and his or her own experience.

With an increasing number of smart home appliances configured in our houses, it also becomes increasingly troublesome for a user to manage the smart home appliances. Apparently in prior arts a technical solution for the user to efficiently manage smart home appliances is absent.

SUMMARY

An embodiment of the disclosure provides an information processing method, a cloud service platform and an information processing system so as to address the existing problem of inefficient management of smart home appliances by a user. The embodiment of the disclosure provides a technical solution to efficient management of smart home appliances so that the user can manage the smart home appliances without relying upon corresponding manuals and his or her experience and efficiency of the user in managing the smart home appliances is improved.

In a first aspect, an embodiment of the disclosure provides an information processing method, and the method includes the following operations. Receiving, by a cloud service platform, appliance operating data and user data transmitted by a smart home appliance control device, where the appliance operating data and the user data is appliance operating data of at least two smart home appliances and user data of a user collected by the at least two smart home appliances under the control of the smart home appliance control device when the user is using the at least two smart home appliances, respectively. Analyzing the appliance operating data and the user data to generate an analysis result. Judging whether the analysis result satisfies a preset condition. And transmitting the analysis result to user equipment of the user when the analysis result satisfies the preset condition, so that the user can manage the at least two smart home appliances according to the analysis result received and output by the user equipment.

In a second aspect, the embodiment of the disclosure provides a cloud service platform including a transceiver, a processor, and a memory storing at least one instruction. The processor is configured to execute the at least one instruction to control the transceiver to connect a smart home appliance control device, and to receive an appliance operating data and user data transmitted by the smart home appliance control device. The appliance operating data and the user data is appliance operating data of at least two smart home appliances and user data of a user collected by the at least two smart home appliances under the control of the smart home appliance control device when the user is using the at least two smart home appliances, respectively. The processor is also configured to execute the at least one instruction to analyze the appliance operating data and the user data to generate an analysis result and to judge whether the analysis result satisfies a preset condition. And the processor is also configured to execute the at least one instruction to control the transceiver to transmit the analysis result to user equipment of the user when the analysis result satisfies the preset condition, so that the user can manage the at least two smart home appliances according to the analysis result received and output by the user equipment.

In a third aspect, the embodiment of the disclosure provides an information processing system including at least two smart home appliances and a smart home appliance control device. The smart home appliance control device is connected with the at least two smart home appliances and is configured to control the at least two smart home appliances to collect appliance operating data of the at least two smart home appliances and user data of a user when the user is using the at least two home appliances. The smart home appliance control device is configured to transmit the appliance operating data and the user data to a cloud service platform connected with the smart home appliance control device. The cloud service platform is configured to analyze the appliance operating data and the user data to produce an analysis result and to transmit the analysis result to user equipment of the user when the analysis result satisfies a preset condition, so that the user can manage the at least two smart home appliances according to the analysis result received and output by the user equipment.

The above-mentioned technical solution(s) according to the embodiment of the disclosure at least has the following technical effect(s).

The embodiment of the disclosure provides an information processing method applicable to a cloud service platform, and the method includes the following operations. Receiving, by a cloud service platform, appliance operating data and user data transmitted by a smart home appliance control device, where the appliance operating data and the user data is appliance operating data of at least two smart home appliances and user data of a user collected by the at least two smart home appliances under the control of the smart home appliance control device when the user is using the at least two smart home appliances, respectively. Analyzing the appliance operating data and the user data to generate an analysis result. Judging whether the analysis result satisfies a preset condition. And transmitting the analysis result to user equipment of the user when the analysis result satisfies the preset condition, so that the user can manage the at least two smart home appliances according to the analysis result received and output by the user equipment.

By utilizing the cloud service platform to receive the appliance operating data of the smart home appliances and the user data of the user, and through the analysis result generated after analysis of the appliance operating data and the user data, the technical solution(s) according to the embodiment of the disclosure provides the user with guidance information for managing the at least two smart home appliances, and addresses the existing problem of inefficient management of smart home appliances by the user. With this technical solution(s) to efficient management of smart home appliances, the user can manage the smart home appliances without relying upon corresponding manual or his or her experience, and management efficiency of the smart home appliances by the user is improved.

DETAILED DESCRIPTION OF AN EMBODIMENT

In order to address the existing problem of inefficient management of smart home appliances by a user, an embodiment of the disclosure provides an information processing method, a cloud service platform and an information processing system. A general idea of the solution according to the embodiment of the disclosure is as follows.

By utilizing a cloud service platform to receive appliance operating data of smart home appliances and user data of a user, and through an analysis result generated after analysis of the appliance operating data and the user data, the technical solution(s) according to the embodiment of the disclosure provides the user with guidance information for managing the smart home appliances, and addresses the existing problem of inefficient management of smart home appliances by the user. With this technical solution(s) to efficient management of smart home appliances, the user can manage the smart home appliances without relying upon corresponding manual or his or her experience, and management efficiency of the smart home appliances by the user is improved.

A main implementation principle, a specific implementation process and corresponding advantageous effects of the embodiment of the disclosure are described below in detail with reference to the drawings.

The embodiment of the disclosure provides an information processing method applicable to a cloud service platform. The cloud service platform can be a cloud computer capable of processing and transmitting data.

Figure 1:
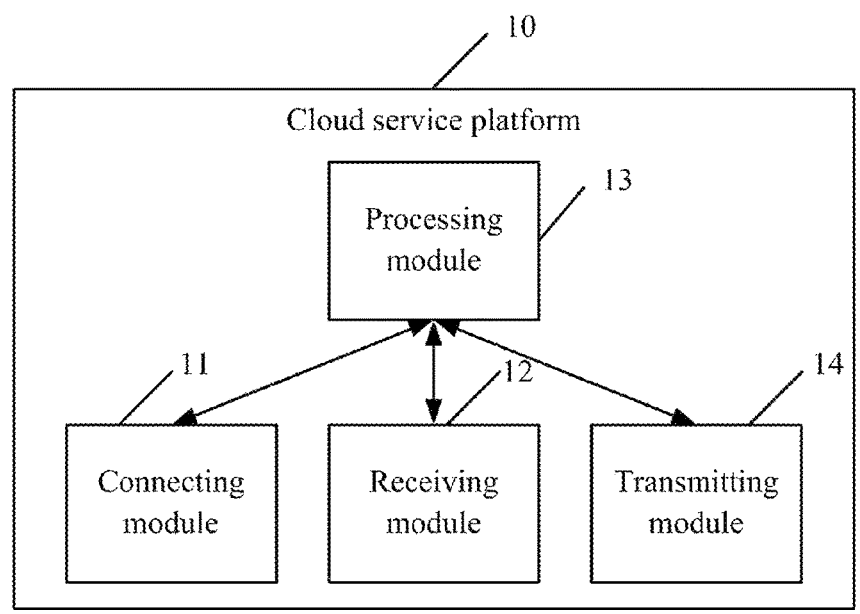
FIG. 1 illustrates a schematic diagram of modules of a cloud service platform according to an embodiment of the disclosure.

FIG. 1 is a schematic diagram of modules of a cloud service platform according to the embodiment of the disclosure. The cloud service platform 10 according to the embodiment of the disclosure includes a connecting module 11, a receiving module 12, a processing module 13 and a transmitting module 14. The processing module 13 is connected with the connecting module 11, the receiving module 12 and the transmitting module 14, respectively. Each module included by the cloud service platform is described below in detail.

The connecting module 11 is configured to connect a smart home appliance control device. In the embodiment of the disclosure, the smart home appliance control device is a smart remote control, a mobile terminal or a wearable device. Specifically, the connecting module can be connected with the smart home appliance control device over a wired network or through a wireless WIFI. Specifically, when connected with the smart home appliance control device through a wireless WIFI, the connecting module 11 is a wireless network card.

The receiving module 12 is configured to receive an appliance operating data and user data transmitted by the smart home appliance control device. The appliance operating data and the user data is appliance operating data of at least two smart home appliances and user data of a user, collected by the at least two smart home appliances under the control of the smart home appliance control device when the user is using the at least two smart home appliances.

Specifically, when the user is using the at least two smart home appliances, the smart home appliance control device collects the appliance operating data of the at least two smart home appliances and also the user data of the user. After connected with the cloud service platform through the connecting module 11, the smart home appliance control device transmits the collected appliance operating data and user data to the processing module 13.

The processing module 13 is configured to analyze the appliance operating data and the user data to generate an analysis result, and to judge whether the analysis result satisfies a preset condition or not. For example, the processing module 13 judges whether the analysis result is used for recommending an operating mode of the at least two smart home appliances for the user, or judges whether the analysis result indicates a failure of at least one of the at least two smart home appliances, or judges whether the analysis result indicates that a software of at least one of the at least two smart home appliances needs to be updated.

The transmitting module 14 is configured to transmit the analysis result to user equipment of the user when the processing module 13 judges that the analysis result satisfies the preset condition, so that the user can manage the at least two smart home appliances according to the analysis result received and output by the user equipment. The user equipment is a smart home appliance, a mobile terminal or a wearable device.

Figure 2:
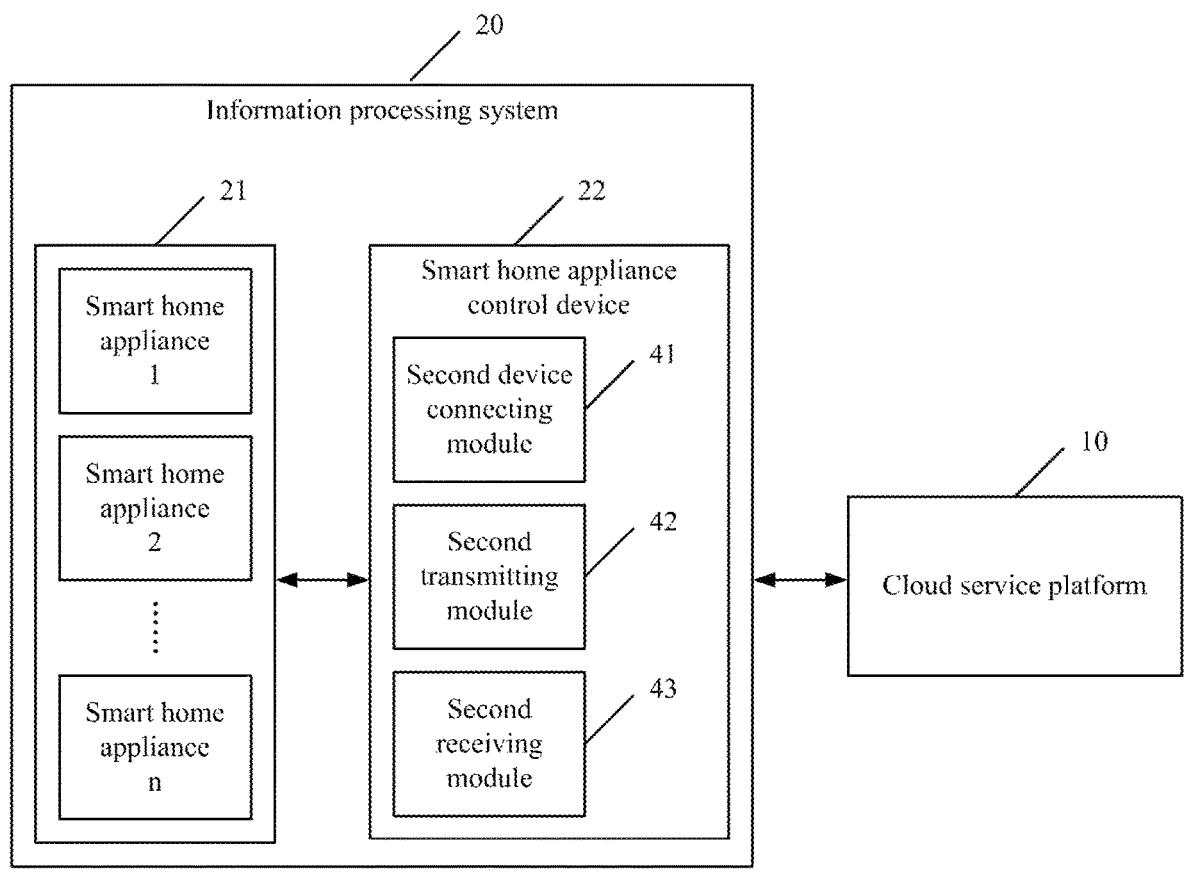
FIG. 2 illustrates a schematic diagram of an information processing system according to the embodiment of the disclosure.

The cloud service platform according to the embodiment of the disclosure analyzes the appliance operating data and the user data transmitted by the smart home appliance control device. The appliance operating data and the user data is collected by the smart home appliances, so data can be transmitted among the cloud service platform, the smart home appliance control device and the smart home appliances. The embodiment of the disclosure also provides an information processing system including a smart home appliance control device and at least two smart home appliances. FIG. 2 is a schematic diagram of modules of the information processing system according to the embodiment of the disclosure. The information processing system 20 includes at least two smart home appliances 21 and a smart home appliance control device 22.

As illustrated in FIG. 2, the at least two smart home appliances 21 include a smart home appliance 1, a smart home appliance 2, . . . , and a smart home appliance n, where n is an integer greater than 1. For example, a smart home appliance can be a smart TV, a smart refrigerator, a smart air conditioner, a smart range hood and a smart range.

Firstly each of the at least two smart home appliances 21 is described below in detail.

Figure 3:
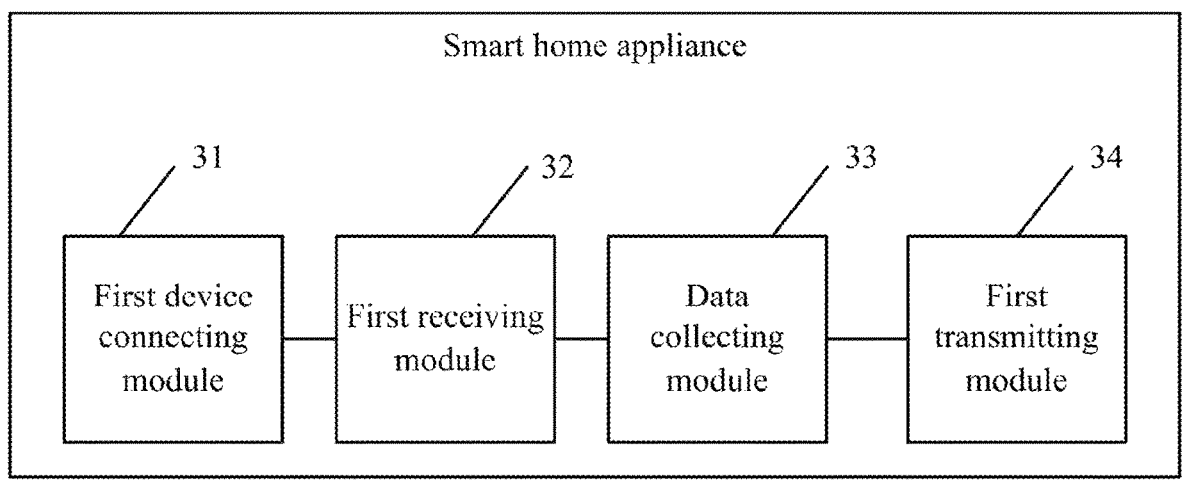
FIG. 3 illustrates a schematic diagram of modules of a smart home appliance according to an embodiment of the disclosure.

As illustrated by FIG. 3, the smart home appliance includes a first device connecting module 31 configured to connect the smart home appliance control device, a first receiving module 32 configured to receive a data collection instruction transmitted by the smart home appliance control device, a data collecting module 33 configured to collect appliance operating data of the at least two smart home appliances and user data of a user, and a first transmitting module 34 configured to transmit the appliance operating data and the user data to the smart home appliance control device.

The smart home appliance control device 22 is described below in detail.

As illustrated by FIG. 2, the smart home appliance control device includes a second device connecting module 41 configured to connect to the at least two smart home appliances and to the cloud service platform, a second transmitting module 42 configured to transmit the data collection instruction to the at least two smart home appliances when the user is using the at least two smart home appliances and to transmit the appliance operating data and the user data to the cloud service platform, and a second receiving module 43 configured to receive the appliance operating data and the user data transmitted by the at least two smart home appliances.

As illustrated by FIG. 2, the information processing system 20 is also connected with the cloud service platform 10.

Figure 4:
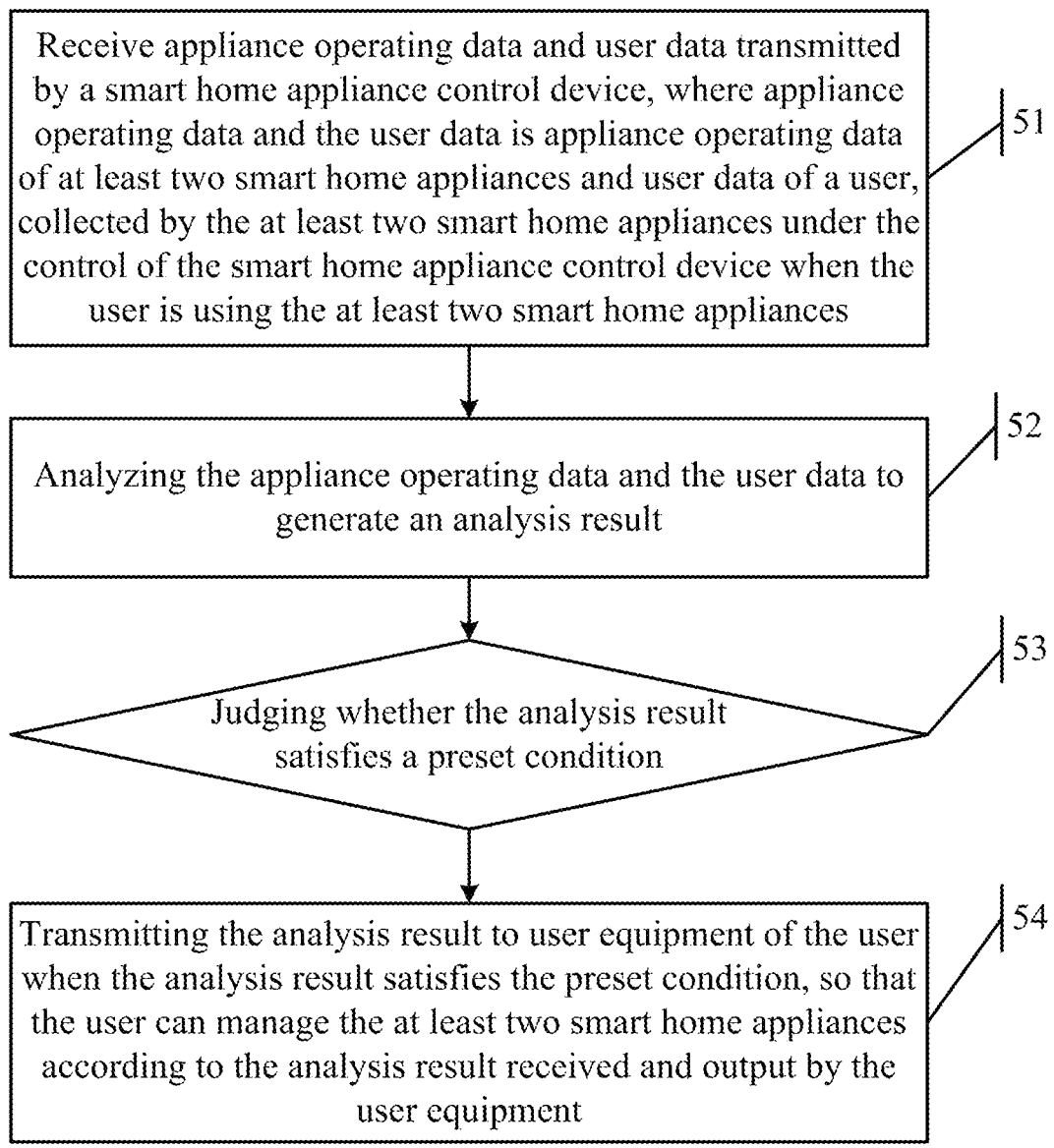
FIG. 4 illustrates a flow chart of an information processing method according to an embodiment of the disclosure.

FIG. 4 is a flow chart of an information processing method according to an embodiment of the disclosure. The information processing method according to the embodiment of the disclosure is executed by the cloud service platform illustrated by FIG. 1. The information processing method includes the following operations.

The operation 51 is receiving appliance operating data and user data transmitted by a smart home appliance control device. The appliance operating data and the user data is appliance operating data of at least two smart home appliances and user data of a user, collected by the at least two smart home appliances under the control of the smart home appliance control device when the user is using the at least two smart home appliances.

The operation 52 is analyzing the appliance operating data and the user data to generate an analysis result.

The operation 53 is judging whether the analysis result satisfies a preset condition.

The operation 54 is transmitting the analysis result to user equipment of the user when the analysis result satisfies the preset condition, so that the user can manage the at least two smart home appliances according to the analysis result received and output by the user equipment.

Firstly an implementation process of the operation 51 is described below in detail.

While the user is using the at least two smart home appliances, each of the at least two smart home appliances includes a data collecting module and is capable of collecting the appliance operating data and the user data. The appliance operating data can be information about the appliance itself, such as a hardware model, a service lifetime or a software version, or can be data generated by the appliance in operation, such as an operating state of the appliance. The user data can be an usage habit of the user.

A smart home appliance is connected with a second device connecting module of the smart home appliance control device through a First device connecting module. The smart home appliance is controlled by the smart home appliance control device. The smart home appliance control device transmits a data collection instruction to the smart home appliance through a second transmitting module, the smart home appliance receives the data collection instruction through a first receiving module, then collects the appliance operating data and the user data through the data collecting module and finally transmits the appliance operating data and the user data to the smart home appliance control device through a first transmitting module. The smart home appliance control device receives the appliance operating data and the user data through a second receiving module.

The smart home appliance control device is connected with a connecting module of the cloud service platform through the second device connecting module, and transmits the appliance operating data and the user data to the cloud service platform through the second transmitting module. The cloud service platform receives the appliance operating data and the user data through a receiving module.

The flow proceeds to the operation 52 after the cloud service platform obtains the appliance operating data and the user data in the operation 51.

Specifically, a processing module of the cloud service platform analyzes the appliance operating data and the user data to produce the analysis result. Since there are a plurality of pieces of appliance operating data and also a plurality of pieces of user data, the processing module analyzes the large amount of data to produce the analysis result.

Then the flow proceeds to the operation 53 of judging whether the analysis result satisfies the preset condition. The operation 53 includes judging whether the analysis result is used for recommending an operating mode of the at least two smart home appliances to the user; or judging whether the analysis result indicates a failure of at least one of the at least two smart home appliances; or judging whether the analysis result indicates that a software of at least one of the at least two smart home appliances needs to be updated.

Specifically, since the processing module of the cloud service platform analyzes a plurality of pieces of user data, an operating mode of a smart home appliance used by a plurality of users can be obtained, and thus the analysis result can indicate an operating mode of the smart home appliance used by most users, so the operating mode used by most users can be recommended to the user.

Alternatively the processing module of the cloud service platform analyzes a plurality of pieces of appliance operating data and determines whether a smart home appliance used by the user has a failure by comparing operating data of smart home appliances of the same model. So the analysis result can indicate a failure of the smart home appliance used by the user.

Alternatively the processing module of the cloud service platform can analyze a plurality of pieces of appliance operating data to obtain a software versions of smart home appliances of a same model, and can determine whether a software of a smart home appliance used by the user needs to be updated by comparing the a software versions of the smart home appliances of the same model. So the analysis result can indicate that the software of the smart home appliance used by the user needs to be updated.

The flow can proceed to the operation 54 according to a judgement result obtained in the operation 53.

Specifically, if the cloud service platform judges that the analysis result satisfies the preset condition through the processing module, it transmits the analysis result to the user equipment of the user through a transmitting module. The user equipment receives and outputs the analysis result, so that the user can manage the at least two smart home appliances according to the analysis result.

For example, when the analysis result is used for recommending an operating mode used by most users to the user, the user equipment may be a smart home appliance being used by the user, a mobile terminal or the smart home appliance control device. The transmitting module of the cloud service platform transmits the analysis result to the user equipment, and the user equipment receives and outputs the analysis result. So that the user could know what the operating mode used by most users is, and then set the operating mode of a corresponding smart home appliance to the operating mode recommended by the cloud service platform, or control the operating mode of the corresponding smart home appliance to be the operating mode recommended by the cloud service platform through the smart home appliance control device.

When the analysis result indicates a failure of a smart home appliance used by the user, the user may be the smart home appliance used by the user, a mobile terminal or the smart home appliance control device. The transmitting module of the cloud service platform transmits the analysis result to the user equipment to output failure information, so that the user could know the failure of the smart home appliance and ask a maintenance person through the user equipment to repair the smart home appliance.

When the analysis result indicates that a software of a smart home appliance used by the user needs to be updated, the user equipment may be a smart home appliance used by the user, a mobile terminal or the smart home appliance control device. The transmitting module of the cloud service platform transmits the analysis result to the user equipment to output software version update information, so that the user could know that the software of the corresponding smart home appliance needs to be updated, and then update the software of the corresponding smart home appliance to the latest version, or control the software of the corresponding smart home appliance to be updated to the latest version through the home appliance control device.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer usable storage mediums (including but not limited to a disk memory, a CD-ROM, an optical memory, etc.) in which computer usable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although an optional embodiment of the disclosure has been described, those skilled in the art benefiting from the underlying inventive concept can make additional modifications and variations to the embodiment. Therefore the appended claims are intended to be construed as encompassing the optional embodiment and all the modifications and variations falling into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations fall into the scope of the claims appended to the disclosure and their equivalents.

The invention claimed is:

1. A method for transmitting information comprising:
receiving, by a cloud service platform, a plurality of pieces of appliance operating data and a plurality of pieces of user data transmitted by a smart home appliance control device, wherein the appliance operating data and the user data are respectively appliance operating data of at least two smart home appliances and user data of a user collected by the at least two smart home appliances under the control of the smart home appliance control device when the at least two smart home appliances are used by the user, wherein the cloud service platform is wirelessly connected to the smart home appliance control device, and the user data indicates a usage habit of the user;
obtaining, by the cloud service platform, software versions of the smart home appliances of the same model by analyzing the plurality of pieces of appliance operating data and the plurality of pieces of user data;
determining, by the cloud service platform, whether a software version of a smart home appliance needs to be updated by comparing the software versions of the smart home appliances of the same model; and transmitting, by the cloud service platform, software version update information for the smart home appliance to the smart home appliance in response to that the software version of the smart home appliance needs to be updated, so that the software version of the smart home appliance is to be updated based on the software version update information.

2. A cloud service platform, comprising:
a transceiver;
a processor; and
a memory storing at least one instruction, wherein the processor is configured to execute the at least one instruction to:

control the transceiver to connect a smart home appliance control device;

control the transceiver to receive a plurality of pieces of appliance operating data and a plurality of pieces of user data transmitted by a smart home appliance control device, wherein the appliance operating data and the user data are respectively appliance operating data of at least two smart home appliances and user data of a user collected by the at least two smart home appliances under the control of the smart home appliance control device when the at least two smart home appliances are used by the user, wherein the cloud service platform is wirelessly connected to the smart home appliance control device, and the user data indicates a usage habit of the user;

obtain software versions of the smart home appliances of a same model by analyzing the plurality of pieces of appliance operating data and the plurality of pieces of user data; determine whether a software version of a smart home appliance needs to be updated by comparing the software versions of the smart home appliances of the same model; and transmit software version update information for the smart home appliance to the smart home appliance in response to that the software version of the smart home appliance needs to be updated, so that the software version of the smart home appliance is to be updated based on the software version update information.

3. A smart system, comprising:

at least two smart home appliances; and a smart home appliance control device, connected with the at least two smart home appliances and configured to control the at least two smart home appliances to collect a plurality of pieces of appliance operating data of the at least two smart home appliances and a plurality of pieces of user data of a user when the at least two home appliances are used by the user, wherein the user data indicates a usage habit of the user;

wherein the smart home appliance control device is configured to:

obtain software versions of the smart home appliances of a same model by analyzing the plurality of pieces of appliance operating data and the plurality of pieces of user data; determine whether a software versions of the smart home appliances of the same model; and transmit software version update information for the smart home appliance to smart home appliance in response to that the software version of the smart home appliance needs to be updated, so that the software version of the smart home appliance is to be updated based on the software version update information.

4. The system according to claim 3, wherein each smart home appliance of the at least two smart home appliances comprises:

a transceiver;

a processor; and a memory storing at least one instruction, wherein the processor is configured to execute the at least one instruction to:

control the transceiver to connect the smart home appliance control device;

control the transceiver to receive a data collection instruction transmitted by the smart home appliance control device;

collect the appliance operating data of the smart home appliance and the user data of the user; and control the transceiver to transmit the appliance operating data and the user data to the smart home appliance control device.

5. The system according to claim 4, wherein the smart home appliance control device comprises:

a transceiver;

a processor; and a memory storing at least one instruction, wherein the processor is configured to execute the at least one instruction to:

control the transceiver to connect the at least two smart home appliances and to connect the cloud service platform;

control the transceiver to transmit the data collection instruction to the at least two smart home appliances when the user is using the at least two smart home appliances, and to transmit the appliance operating data and the user data to the cloud service platform; and control the transceiver to receive the appliance operating data and the user data transmitted by the at least two smart home appliances.

6. The system according to claim 3, wherein the smart home appliance control device is a smart remote control, a mobile terminal or a wearable device.

* * * * *